(12) United States Patent
Corum

(10) Patent No.: US 8,317,346 B2
(45) Date of Patent: Nov. 27, 2012

(54) VEHICLE SIDE VIEW MIRROR SYSTEM

(76) Inventor: Rick Corum, Florence, AL (US)

( * ) Notice: Subject to any disclaimer, the term of this patent is extended or adjusted under 35 U.S.C. 154(b) by 47 days.

(21) Appl. No.: 12/643,275

(22) Filed: Dec. 21, 2009

(65) Prior Publication Data

US 2010/0208373 A1 Aug. 19, 2010

Related U.S. Application Data

(63) Continuation-in-part of application No. 11/592,361, filed on Nov. 3, 2006, now abandoned.

(60) Provisional application No. 60/734,213, filed on Nov. 7, 2005.

(51) Int. Cl.
*G02B 5/08* (2006.01)
*G02B 7/18* (2006.01)

(52) U.S. Cl. ......................................... 359/860; 359/844
(58) Field of Classification Search ................. 359/860, 359/844
See application file for complete search history.

(56) References Cited

U.S. PATENT DOCUMENTS

| | | | |
|---|---|---|---|
| 2,210,147 A * | 8/1940 | Griffith ......................... | 248/481 |
| 6,357,883 B1 * | 3/2002 | Strumolo et al. ............. | 359/857 |
| 6,935,758 B2 * | 8/2005 | Plaster ........................... | 359/850 |
| 2003/0117731 A1 * | 6/2003 | Platzer, Jr. .................... | 359/850 |

* cited by examiner

*Primary Examiner* — Jade R Chwasz
(74) *Attorney, Agent, or Firm* — David W. Barman

(57) ABSTRACT

A mirror assembly for a vehicle that has a double curved mirror positioned next to a vehicle side view mirror and said double curved mirror along with said side view mirror allows a user to view the lower perimeter of the vehicle in the side view mirror while operating the vehicle.

6 Claims, 16 Drawing Sheets

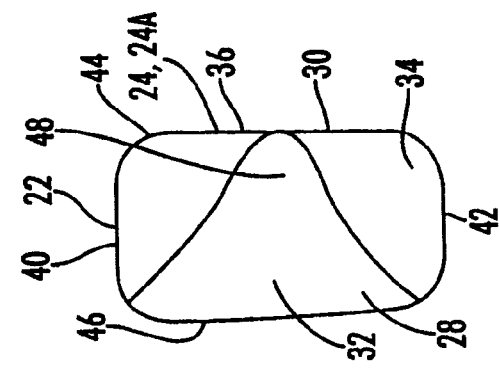
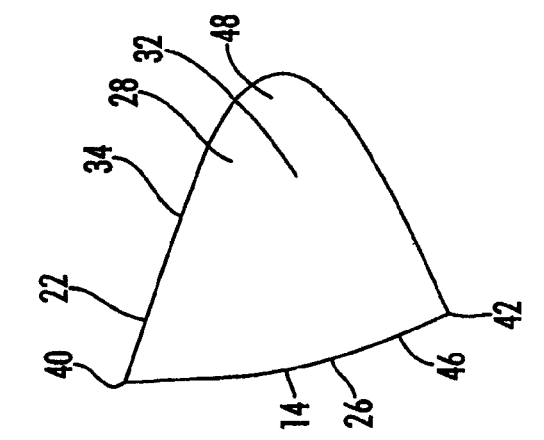
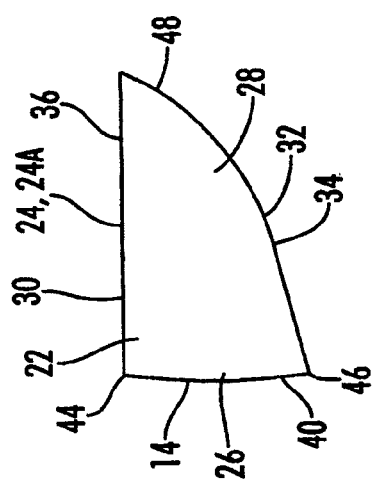
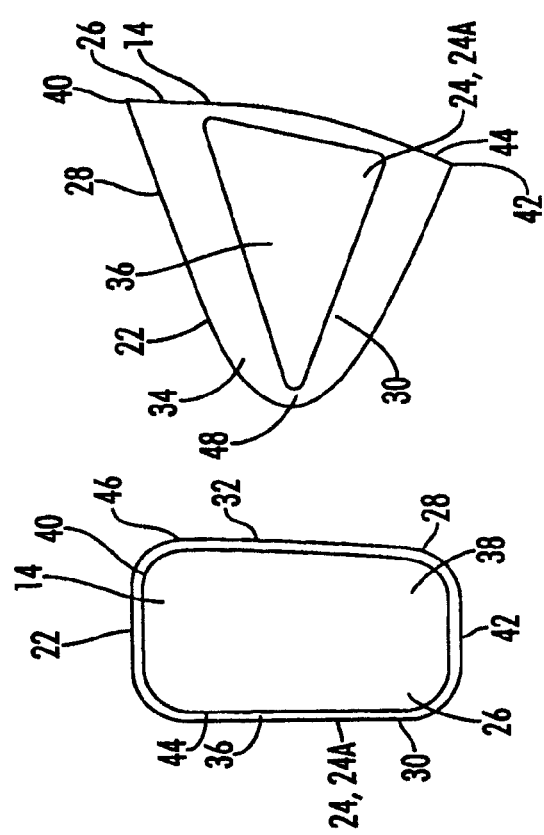

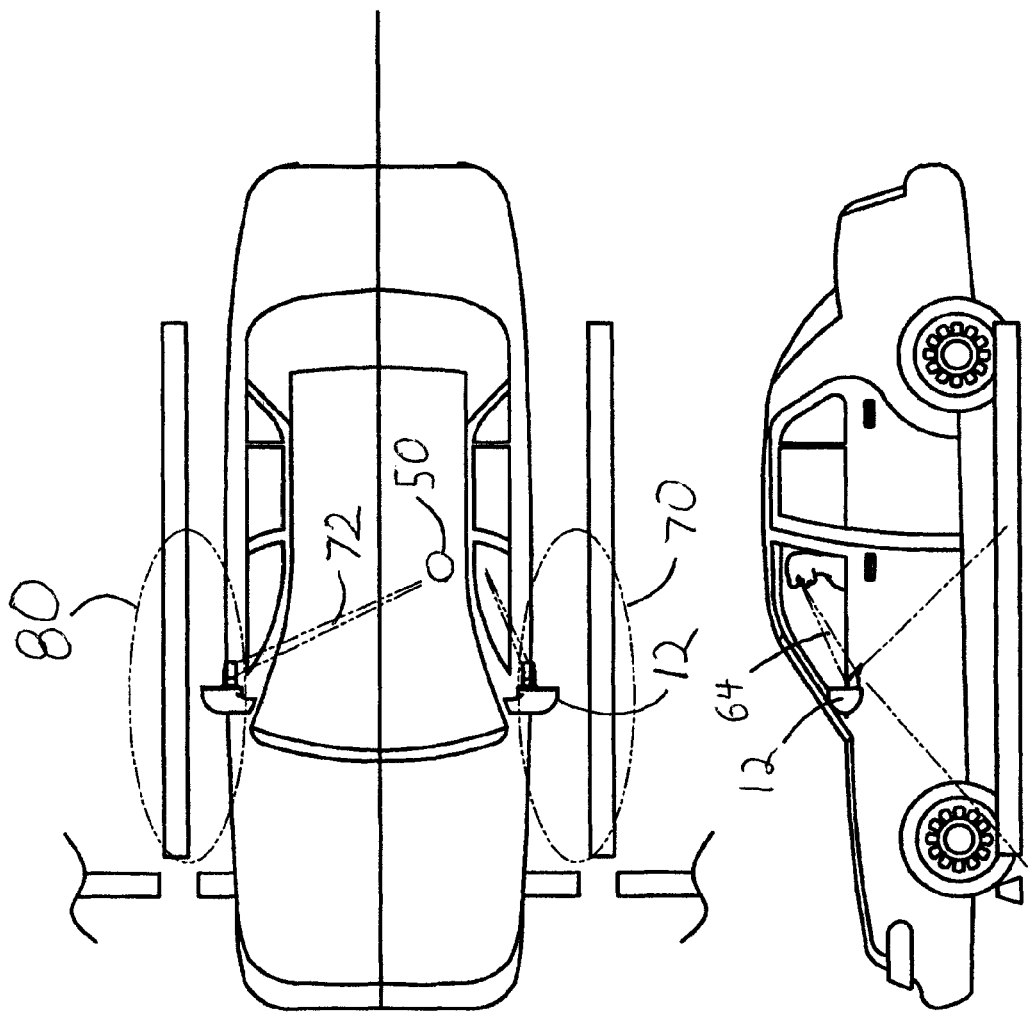

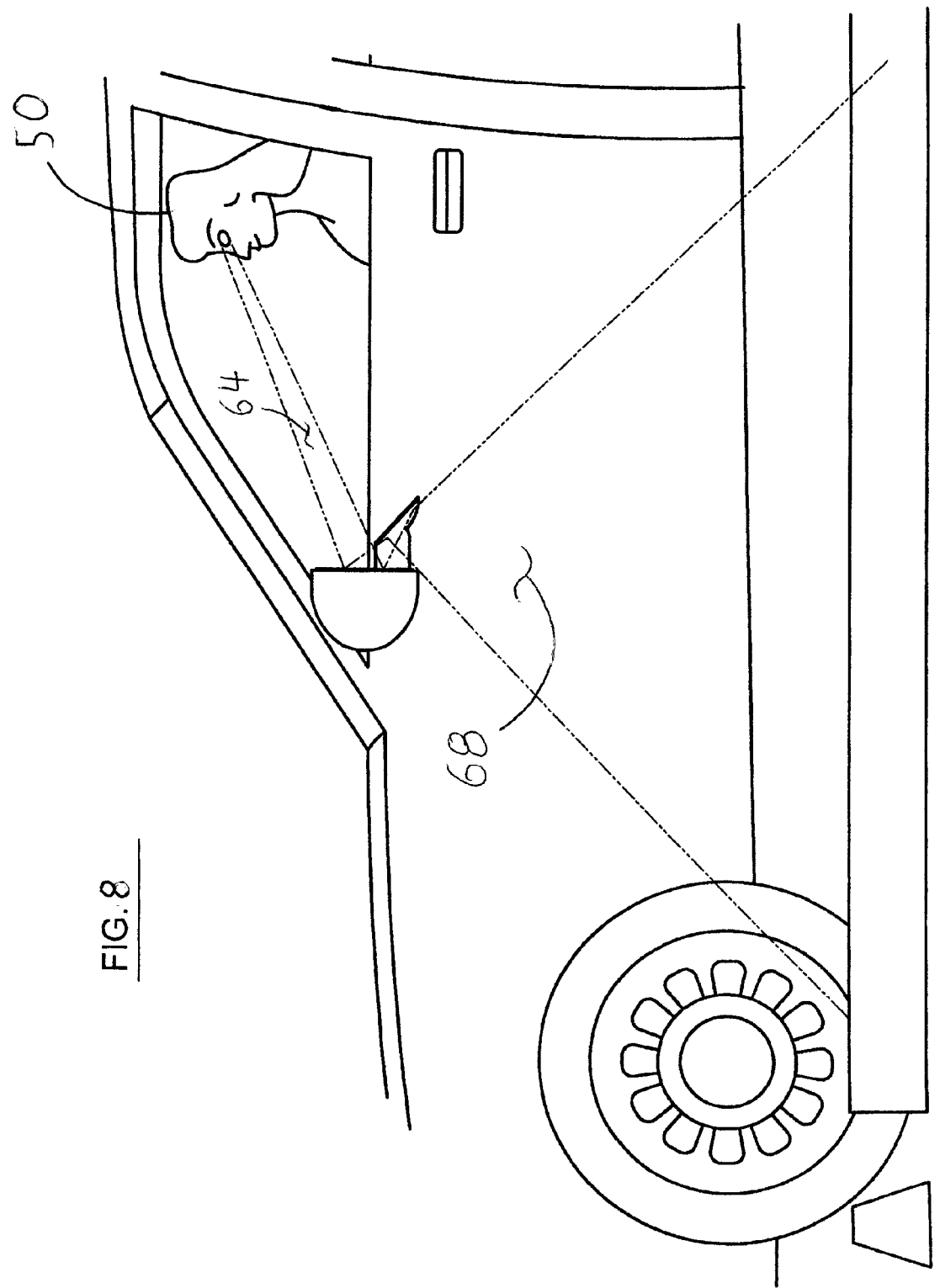

SECTION A-A

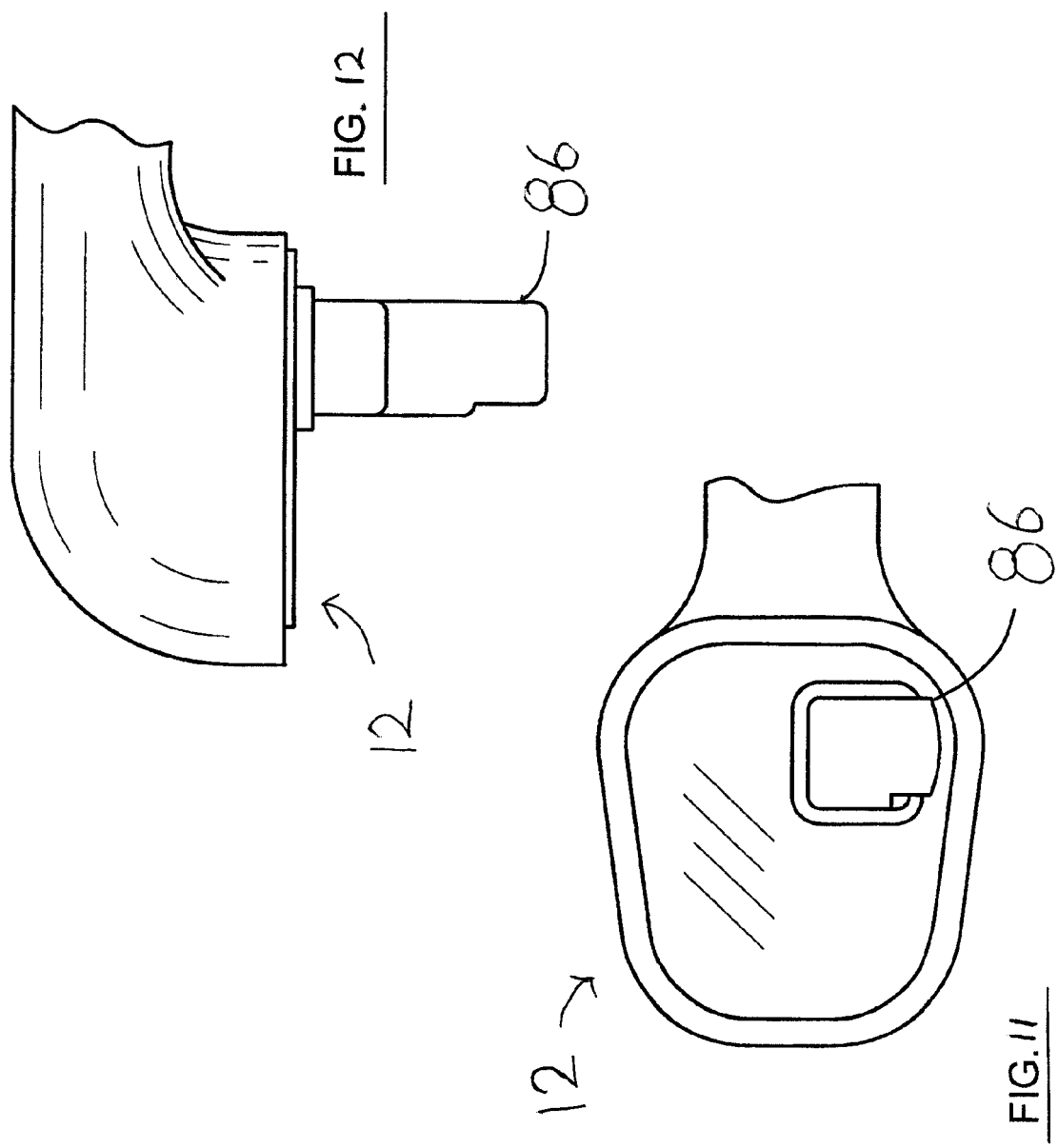

SECTION B-B

SECTION C-C

SECTION D-D

VEHICLE SIDE VIEW MIRROR SYSTEM

CROSS-REFERENCES TO RELATED APPLICATIONS

This application is a continuation-in-part of U.S. patent application Ser. No. 11/592,361, filed Nov. 3, 2006 which claims the benefit of provisional U.S. Patent Application Ser. No. 60/734,213 filed Nov. 7, 2005, entitled "Vehicle Side View Mirror Accessory" the disclosures of which incorporated herein by reference in their entirety.

BACKGROUND OF THE INVENTION

1. Description of the Prior Art

The present invention relates generally to mirror assemblies for vehicles.

U.S. Pat. No. 5,119,236 shows a mirror assembly attached to an airplane for viewing objects distant from the airplane. The application discloses a system for solving the problem caused by submerged cockpits within high speed aircraft. Because of the submersion in the cockpit, the nose of the aircraft often severely limits the field of view of the pilot. Thus, the patent discloses a mirror assembly for displaying the field of view blocked by the nose of the aircraft. The art does not disclose a system for viewing an area near and at the lower perimeter of the vehicle.

U.S. Pat. No. 4,685,779 discloses a mirror assembly which provides an enhanced view to the automobile driver of objects located beyond the forward end of the automobile and, in particularly, beyond a preceding vehicle. A mirror is mounted on a side opposite another mirror and serves as a side disposed rearview mirror. Thus, the system is not designed to provide the operator with a view of an area located at the lower perimeter of the vehicle.

2. Brief Summary of the Invention

This invention pertains to a mirror assembly having a reflecting mirror which is mounted below and facing the side view mirror of a vehicle. The reflecting mirror permits a driver to view an image of an area along the lower perimeter of the vehicle. Often, owners of vehicles need to position the vehicle close to a boundary or within a predetermined location. For example, owners of automobiles must park their cars in parking spaces, thus requiring them to park the vehicle between two predetermined parking lines. To perform this task, it is particularly advantageous to be able to view an area along the lower perimeter of the vehicle to appropriately park or position the vehicle in the desired area. In this manner, the owner of the vehicle is able to determine the precise distance between the vehicle and the parking lines. Furthermore, this invention is useful for any task, not just parking, in which the vehicle operator requires a view of a section along the lower perimeter of the vehicle in order to perform a task.

According to the invention, the vehicle has a side view mirror. A reflecting mirror is mounted on the vehicle below the side view mirror and facing the side view mirror such that the reflecting mirror is oriented to reflect an image along the lower perimeter of the vehicle. Normally, to assist in parking, the image reflected into the vehicle is of an area surrounding the front tire of the vehicle. This provides the driver with a view of the exact distance between the vehicle and the parking line. The reflecting mirror may be mounted either on the side view mirror or, preferably, on a vehicle body panel.

Accordingly, one object of the present invention is to provide a vehicle operator with a view along the lower perimeter of the vehicle.

Another object of the present invention is to provide the driver of an automobile with a view along the lower perimeter of the vehicle.

Yet another object of the present invention is to assist the operator of a vehicle with the parking of the vehicle.

Still another object of the present invention is to display an image to vehicle operator of an area surrounding the front tire of the vehicle.

In one embodiment the present invention is a vehicle mirror assembly system, comprising:
   a vehicle having a side view mirror; and
   a double curved reflecting mirror mounted on the vehicle below said side view mirror and having a reflective surface facing the said side view mirror, the said double curved reflecting mirror being oriented to reflect an image of an area along a lower perimeter of the a vehicle on the side view mirror such that the said image is viewable by a driver operating the vehicle, wherein the area includes the front tire.

The system double curved mirror is in a housing and said housing is attached to a vehicle side view mirror or a vehicle side view mirror housing.

The double curved mirror has a first curvature along a vertical axis and a second curvature along a horizontal axis.

The first curvature and said second curvature being of unequal degrees of curvature.

The double curved mirror is in a housing that is adjustable.

The present invention is also a method of viewing an area along the lower perimeter of a vehicle with a side view mirror while operating the vehicle, comprising:
   providing a double curved reflecting mirror attached to a vehicle side view mirror, said double curved mirror having a reflective surface facing a vehicle side view mirror; and
   reflecting an image of an area onto the side view mirror with said double curved reflecting mirror such that a vehicle operator in a vehicle operating position can view said image; wherein said image includes a surface on which said vehicle resides.

BRIEF DESCRIPTION OF THE DRAWINGS

FIG. 2A is a front view of one embodiment of the reflecting mirror assembly.

FIG. 2B is a side view of the reflecting mirror assembly of 2A showing the attaching lateral surface.

FIG. 2C is an opposite side view of the reflecting mirror assembly of FIG. 2A showing the side opposite the attaching lateral surface.

FIG. 2D is a rear view of the reflecting mirror assembly of FIG. 2A.

FIG. 2E is a top view of the reflecting mirror assembly of FIG. 2A.

FIG. 6 is a side view showing a driver and field of vision alongside a car.

FIG. 7 is a top view showing a driver and field of vision alongside each side of a car.

FIG. 8 is a side view showing a driver and field of vision alongside a car.

FIG. 11 is a front view looking into a vehicle side view mirror with a double curved mirror of the present invention attached thereto.

FIG. 12 is a top view looking into a vehicle side view mirror with a double curved mirror of the present invention attached thereto.

DETAILED DESCRIPTION OF THE INVENTION

Figure 1A:
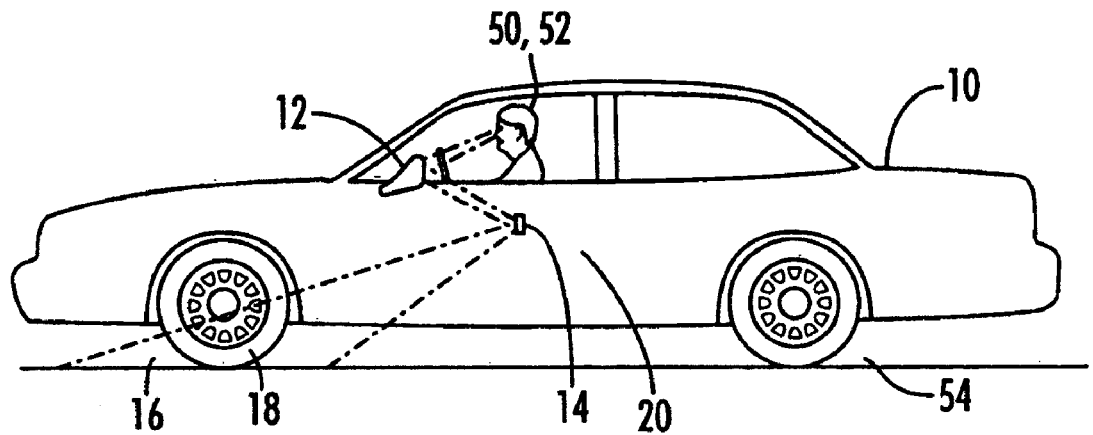
FIG. 1A is a side view of the vehicle mounted with one embodiment of the vehicle mirror assembly with the reflecting mirror assembly attached to a body side panel.
Figure 1B:
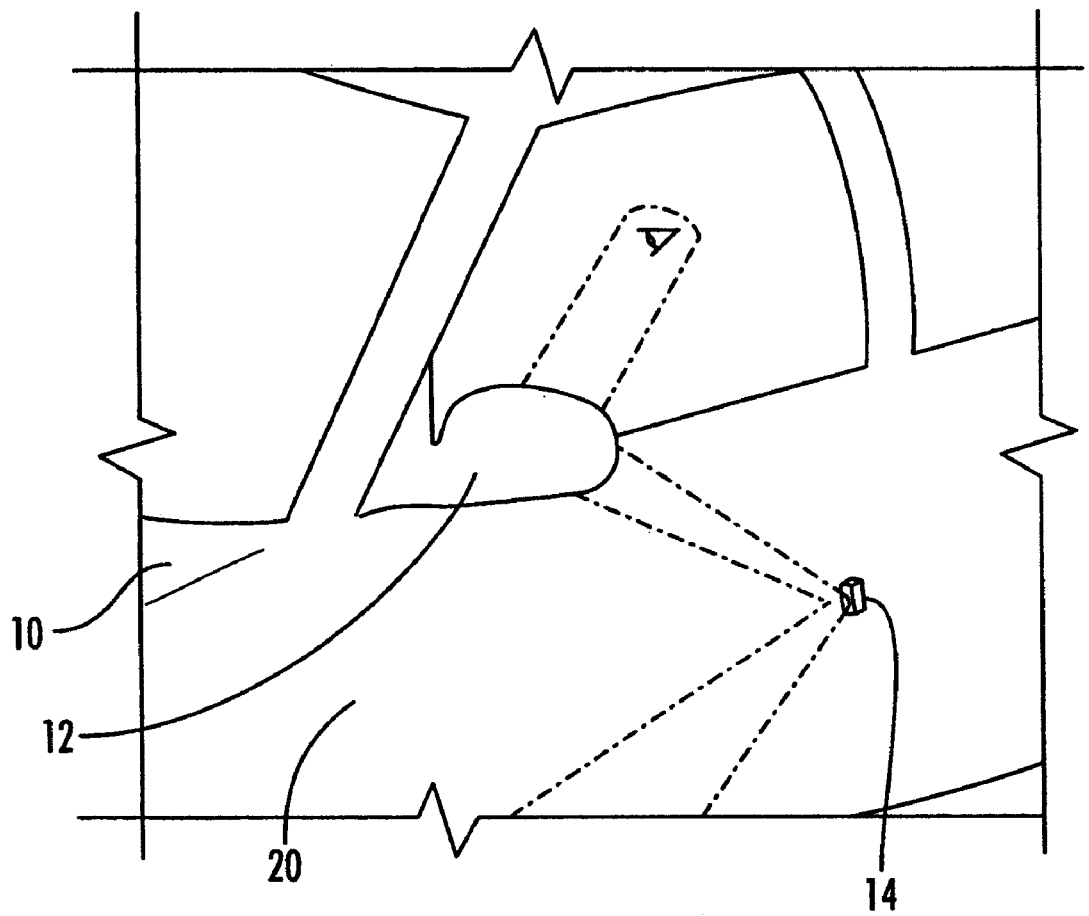
FIG. 1B is a front perspective view of one embodiment of the vehicle mirror assembly of FIG. 1A.
Figure 1C:
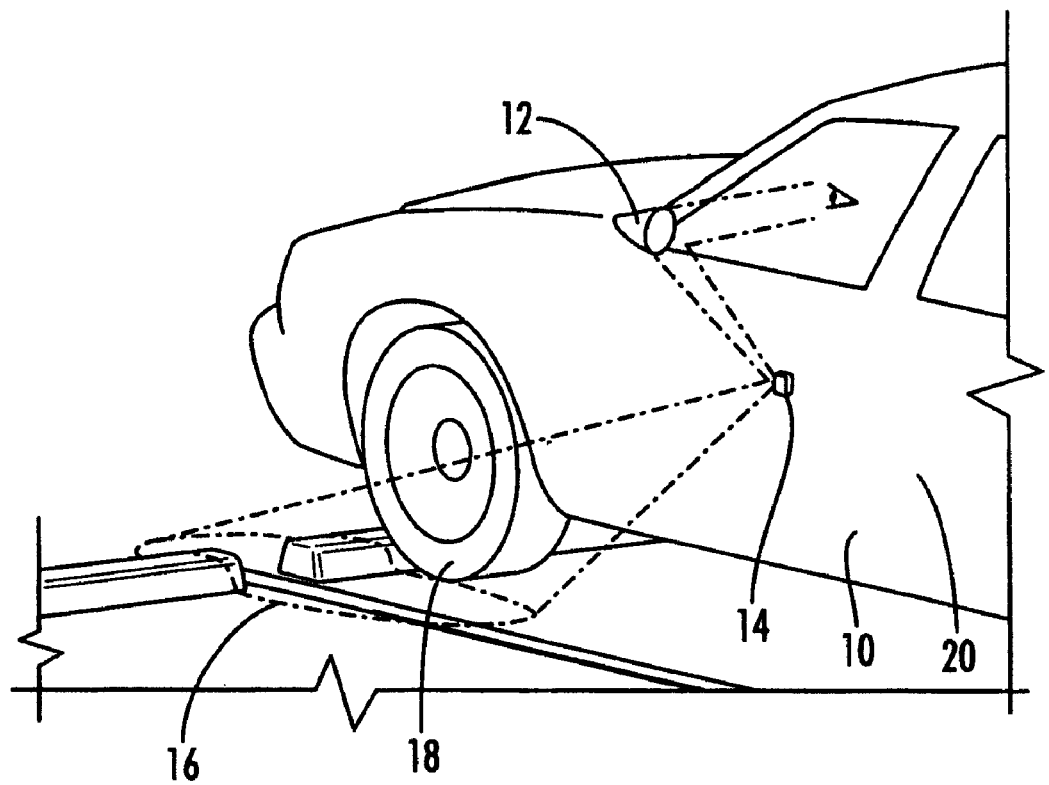
FIG. 1C is an anterior perspective view of one embodiment of the vehicle mirror assembly of FIG. 1A.

Referring now to FIGS. 1A, 1B, 1C, and 1D, a vehicle 10 is shown having a side view mirror 12. As is known, a side view mirror 12 is a functional type of mirror found on vehicles, designed to allow the driver to see an area lateral to and behind the vehicle. Thus, side view mirrors are designed to allow a driver to view objects which are distant and behind the car thereby increasing the driver's field of view. However, these mirrors are not designed to display an image along a lower perimeter of the vehicle 10. An image along the lower perimeter of the vehicle 10 is advantageous for many tasks during operation of the vehicle including, and in particular, the parking of the vehicle 10.

In order to provide this advantage, a reflecting mirror 14 is mounted on the vehicle 10 below the side view mirror 12 and facing the side view mirror 12. In this manner, the reflecting mirror 14 is oriented to reflect an image of an area 16, along a lower perimeter of the vehicle 10, on the side view mirror 12. This image is viewable by the driver 50, operating the vehicle 10, and thus provides the driver 50 with a method of viewing a lower perimeter of the vehicle 10 while performing a required task.

In this application, the vehicle 10 may be any vehicle which may be equipped with a side view mirror 12. Thus, the vehicle may be an automobile, an airplane, a boat, a ship, a bicycle, a motorcycle, a truck, including an eighteen wheeler truck, a humvee, or a locomotive.

Figure 1D:
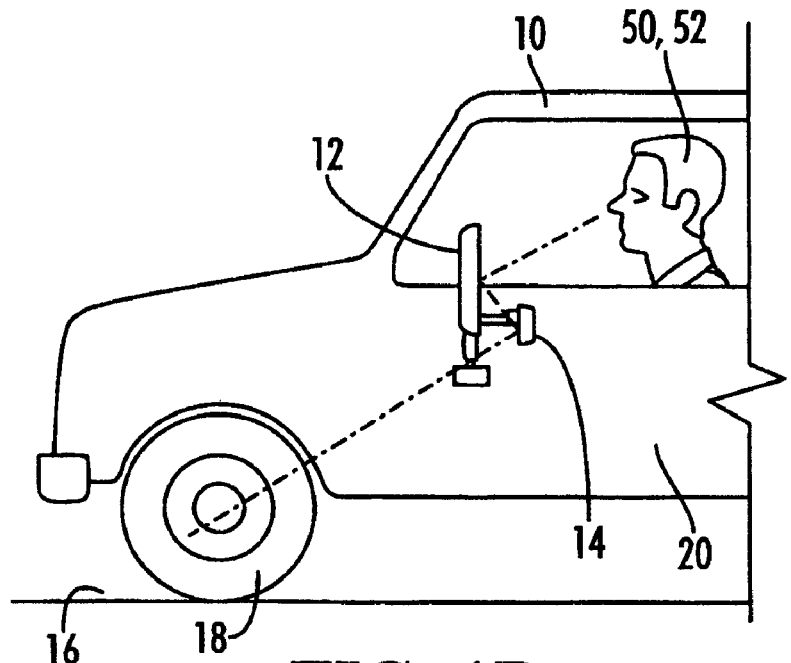
FIG. 1D is a side view of a second embodiment of the vehicle mirror assembly with the reflecting mirror attached to the side view mirror.

In particular, the area 16 for viewing along the lower perimeter of the vehicle 10 may comprise a front tire 18 mounted on the vehicle 10. By reflecting this image into the side view mirror 12, the driver 50 can judge the distance between the vehicle 10 and a particular boundary location. Referring particularly to FIGS. 1A and 1D, the reflecting mirror 14 may be mounted on the side view mirror 12 or on a body panel 20 of the vehicle 10. In the preferred embodiment, the reflecting mirror 14 is mounted on the body panel 20 of the vehicle 10 because this provides a user with a greater degree of freedom as to the area 16 along the lower perimeter of the vehicle 10 to view in the side view mirror 12.

Referring now to FIGS. 2A to 2E, a reflecting mirror assembly which attaches to a vehicle body panel 20 is shown. As can be seen in the figures, the reflecting mirror assembly has a housing 22 having a lateral surface 24 and an open face 26. The lateral surface 24 includes an attachment device 36 for attaching the assembly to the vehicle body panel 20. The preferred attachment device 36 is a pressure sensitive adhesive. However, any device for attaching a mirror assembly to a body panel 20 may be utilized. For example, the reflecting mirror assembly may use screws for attachment or may be welded to the body panel 20. As is shown in FIGS. 2B and 2E, the lateral surface 24 is normally a flat lateral surface 24A for attaching the reflecting mirror assembly substantially flush with the vehicle body panel 20. By providing a reflecting mirror 14 flush with a body panel 20, the projection of the reflecting mirror 14 out from the body panel 20 is reduced thereby increasing the aerodynamics of the reflecting mirror assembly. The reflecting mirror 14 is mounted within the open face 26 for viewing the selected area 16 within the side view mirror 12.

This reflecting mirror assembly design is constructed to maximize the aerodynamics of the mirror assembly when the mirror assembly is attached to the body panel 20. As is shown in 2A, the open face 26 is designed such that a greater portion of the area 38 of the open face 26 is toward the body panel 20 thereby decreasing the drag coefficient of the mirror assembly. For example, the open face 26 is extended over an area 38 having a top edge 40, a bottom edge 42, a lateral body panel edge 44, which is next to the body panel 20, and a second lateral edge 46 opposite the lateral body panel edge 44. The lateral edges 44 and 46, are longer than the top and bottom edges 40 and 42, which locates a greater portion of the area 38 toward the body panel 20.

As is shown in FIG. 2A, the open face 26 may be the same shape as the reflecting mirror 14 thereby further increasing the aerodynamics of the reflecting mirror assembly. Furthermore, the housing 32 is shaped in an aerodynamic configuration in order to further reduce the drag coefficient of the mirror assembly. As is shown in FIGS. 2B through 2E, the housing 22 may be shaped in a streamline half-body configuration 28 with a base 30. A streamline configuration is a body shape which reduces the turbulence of a fluid or gas passing across the body. In streamline bodies, the current of fluid flow that a streamline body breaks tends to reunite in its wake, as contrasted with the turbulence created by the partial vacuums and eddies in the wake of a non-streamline body. A streamline design is typically a long ellipse like configuration tapering to a point in the direction of the base 30. The base 30 of the streamline half-body configuration 28 may comprise the flat lateral surface 24A.

Furthermore, the streamline half-body configuration 28 may be shaped in a substantially half-conic configuration 34. A half-conic configuration 34 may further comprise a blunted nose 48 at the point of tapering in the direction of air flow thereby furthering decreasing the drag coefficient of the mirror assembly.

Figure 3:
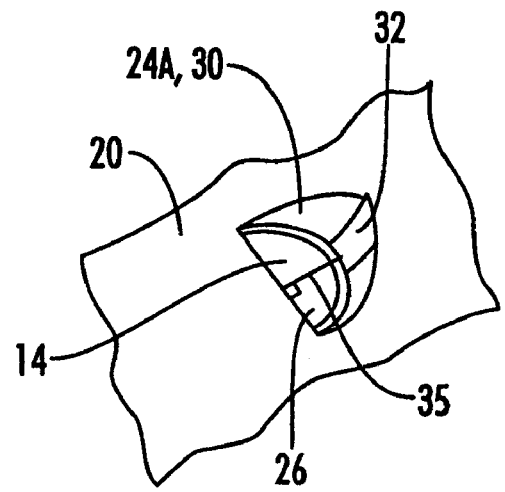
FIG. 3 is a perspective view of the reflecting mirror assembly of FIG. 2A attached to a vehicle body panel.

Referring now to FIG. 3, the reflecting mirror assembly of FIGS. 2A-2E is shown attached to the vehicle body panel 20. The crest 32 of the streamline half-body configuration may be perpendicular to a line 35 normal to the vehicle body panel 20. In this manner, the design maximizes the aerodynamics of the mirror assembly when the mirror assembly is attached to the vehicle body panel 20.

Figure 4:
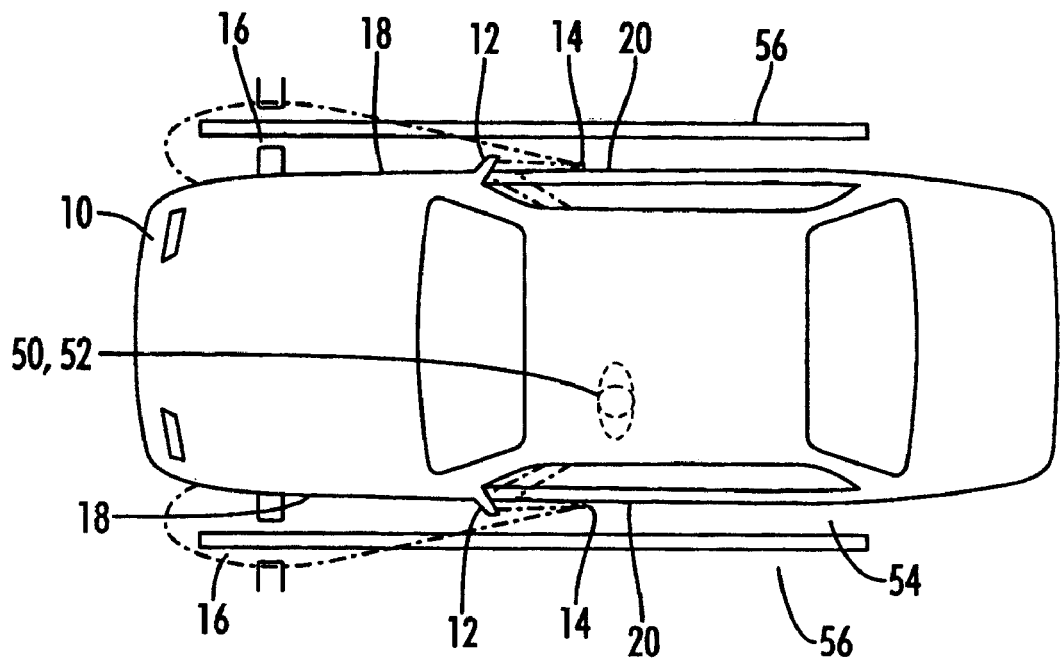
FIG. 4 is a top view of a vehicle with the vehicle mirror assembly of FIG. 1A while the vehicle is parked in a parking location.

Referring now to FIG. 4, the advantages of utilizing the invention to park a vehicle 10 provided with a side view mirror 12 are shown. As is shown by the figure, an image of the area 16 along the lower periphery of the vehicle 10 is reflected onto the side view mirror 12. This area may include at least a portion of one of the front tires 18. When the vehicle operator 50 moves the vehicle 10 toward the parking location 54 while in a vehicle operator position 52, the driver can view the image of the area 16 on the side view mirror 12. In this manner, the vehicle operator 50 can determine the distance between the vehicle 10 and the set of parking lines 56. If the vehicle 10 is being placed within the set of parking lines 56, an image showing the appropriate spacing between the parking lines 56 and the vehicle 10 is shown. Otherwise, the vehicle operator 50 will again move the vehicle 10 until the vehicle 10 is placed within the set of parking lines 56.

Figure 16:
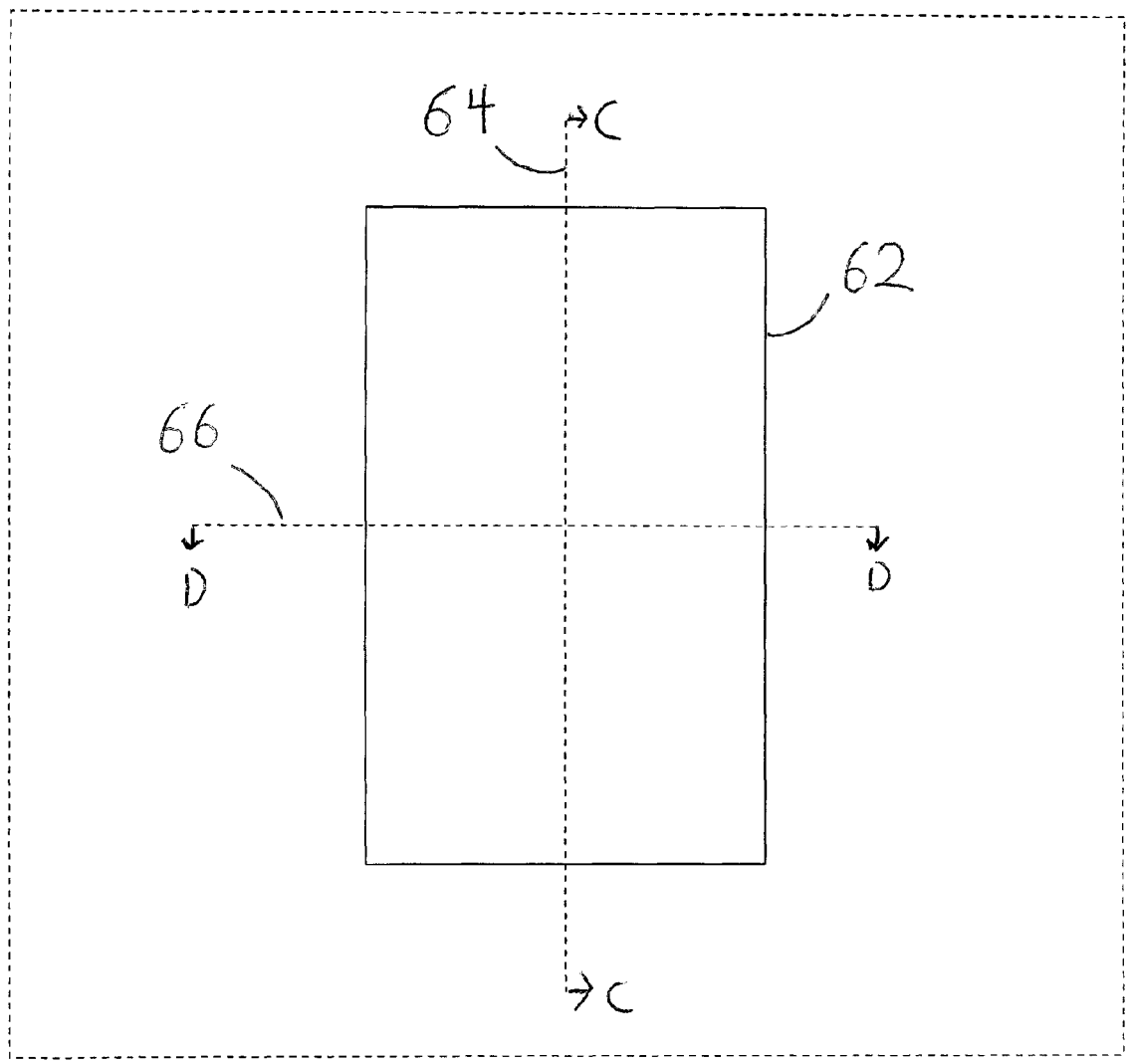
FIG. 16 is a front diagrammatic view of a double curved mirror having a vertical and horizontal axis.
Figure 17:
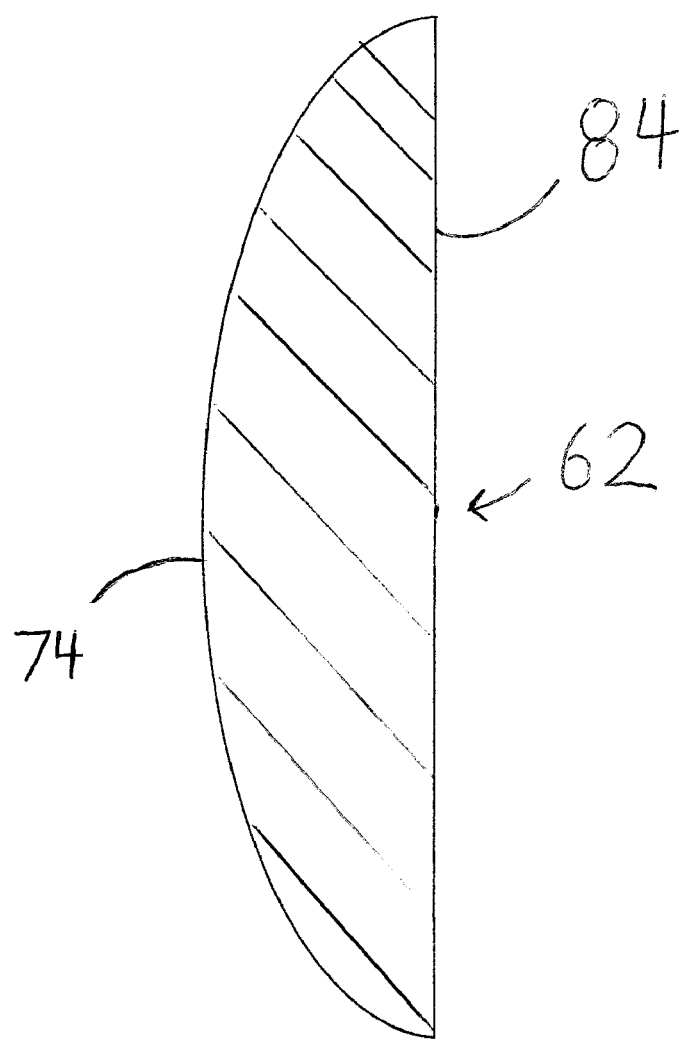
FIG. 17 is a cross section along section lines C_C from FIG. 16.
Figure 18:
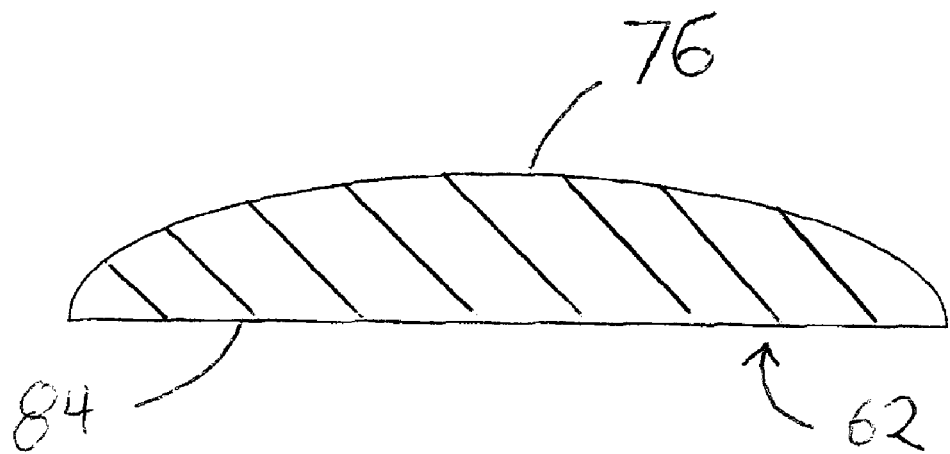
FIG. 18 is a cross section along section lines D-D from FIG. 16.

Another embodiment of the present invention is set forth in FIGS. 5-18. The present invention is a curved mirror used with existing vehicle side view mirror 12. Although the figures and explanation relate to a double curved mirror, is contemplated that various curved configurations including, but not limited to convex, parabolic and spherical. The curved mirror is convex, spherical, or double curved. FIGS. 16-18 demonstrate a simplified schematic of a double curved mirror 62. FIG. 16 is a front view of double curved mirror 62. Double curved mirror 62 has a vertical axis 64 and a horizontal axis 66. FIGS. 17 and 18 are not drawn to scale. FIG. 17 shows double curved mirror 62 having a vertical curvature 74 along the outer reflective surface of double curved mirror 62. FIG. 18 shows double curved mirror 62 having a horizontal curvature 76 along the outer reflective surface of double curved mirror 62. Double curved mirror 62 is configured with size and degree of curvature depending on the length of vehicle and the desired size of surface viewing area 70.

The double curved mirror 62 of the present invention is an improvement over prior flat and curved mirrors because the double curved mirror reflects an image that is longer in one axis than the other and therefore presents an elongated field of view to a flat mirror surface, thus allowing a larger area to be viewed at a shorter distance. Flat mirror to flat mirror reflections are limited in viewing areas and oncoming head lights can be blinding to a driver. The double curved mirror 62 of the present invention eliminates unwanted reflection due to orientation in relation to the driver, as seen in the embodiment of FIGS. 5, 9, 12, double curved mirror 62 is positioned on a forward angular offset such that oncoming headlights are not reflected into double curved mirror 62.

Figure 5:
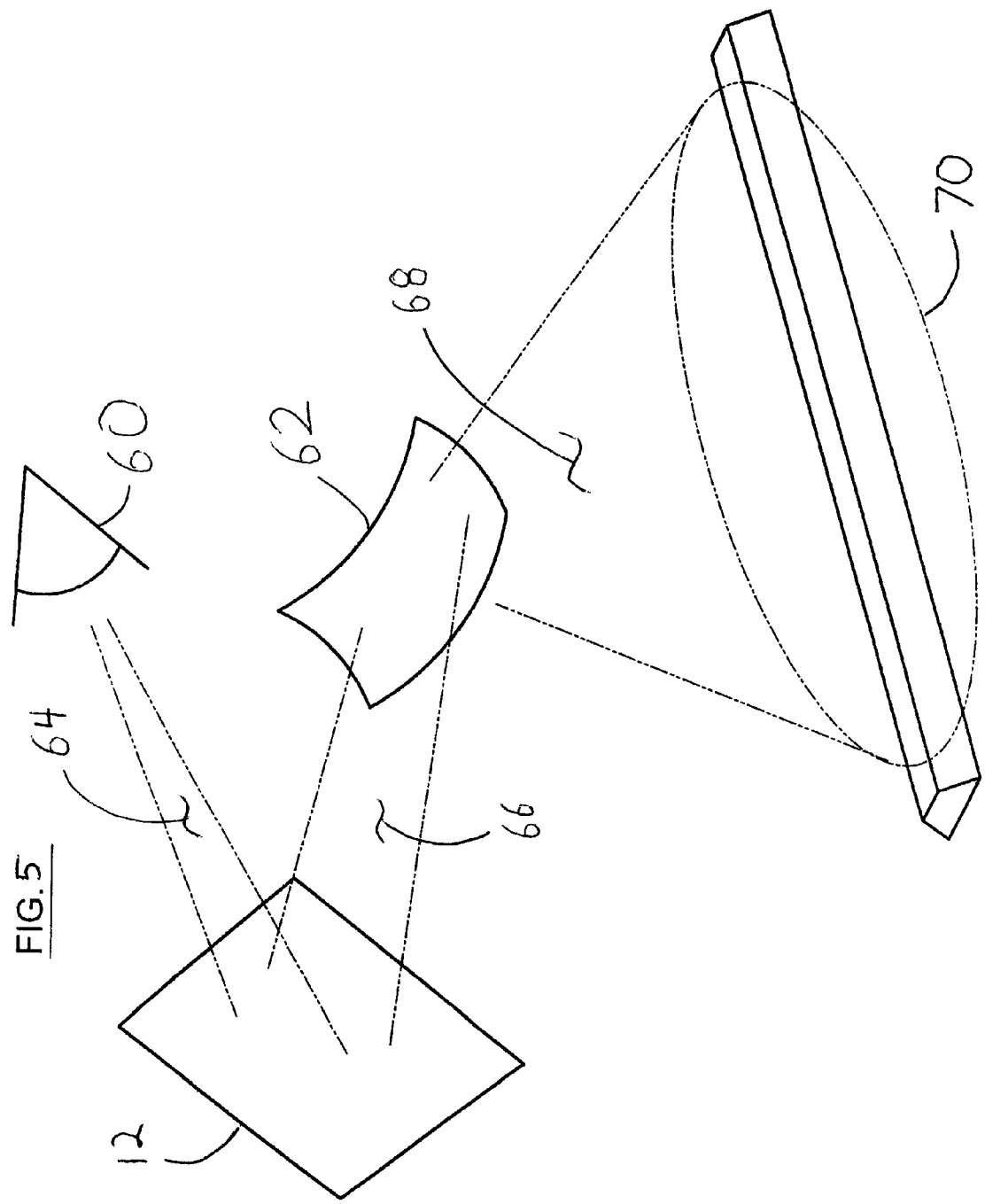
FIG. 5 is a diagrammatic schematic of one embodiment showing field of vision from a side view mirror to a double curved mirror and to the ground.

FIG. 5 shows a schematic of the system. The eye 60 of a driver 50 (shown in FIG. 1A) has a first line viewing area 64. First line viewing area 64 allows driver 50 to view side view mirror 12. First reflected line of sight 66 is reflected off of side view mirror 12 and towards double curved mirror 62. Second reflected line of sight 68 is reflected off of double curved mirror 62 and allows driver 50 to see driver side viewing area 70 (FIG. 7). Driver 50 also has a passenger side first line viewing area 72 in which a double curved mirror 62 mounted on side view mirror 12 on the passenger side of vehicle 10 provides driver 50 the ability to view passenger side viewing area 80.

Figure 9:
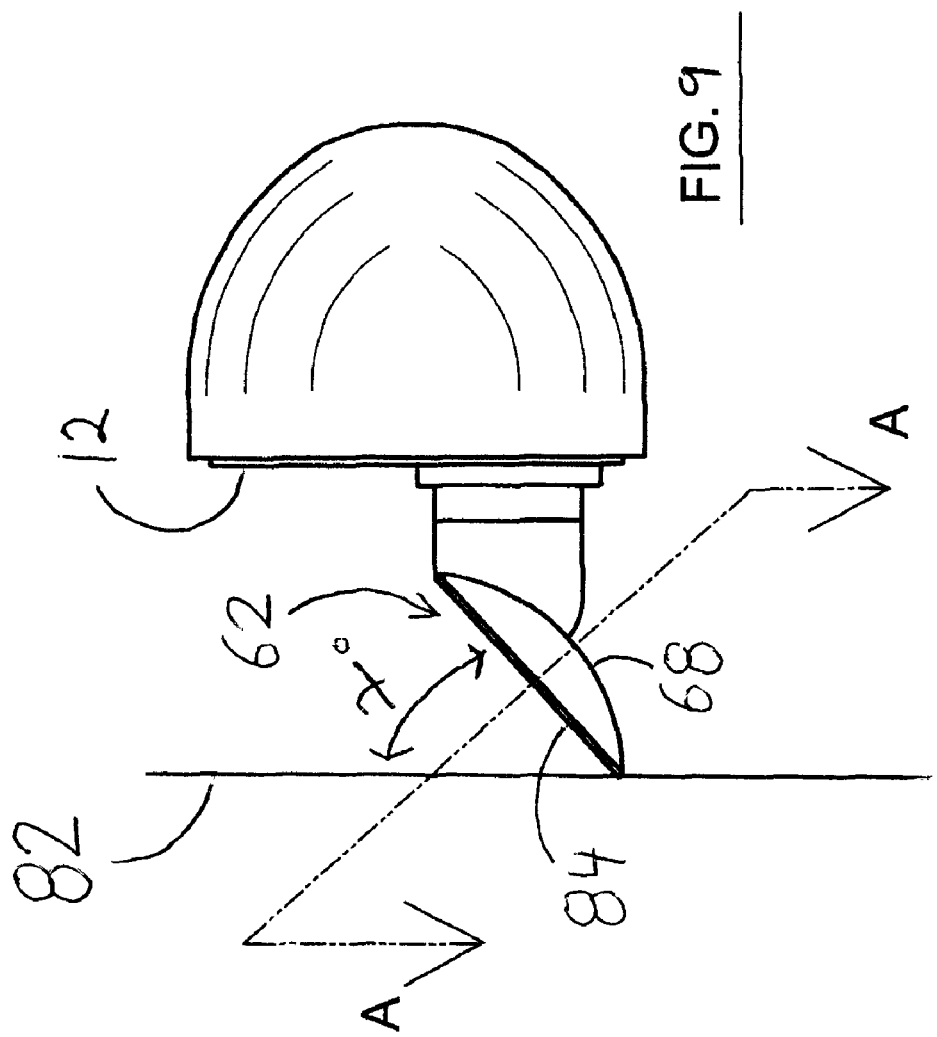
FIG. 9 is a close up side view of a side view mirror and a double curved mirror attached thereto.
Figure 10:
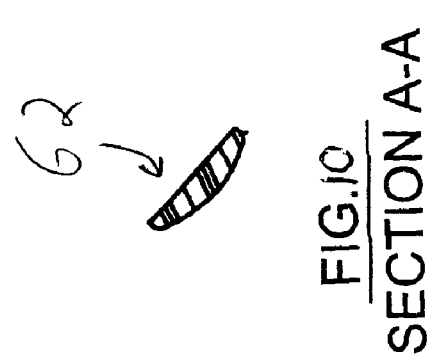
FIG. 10 is a cross section along section lines A-A from FIG. 9.
Figure 13:
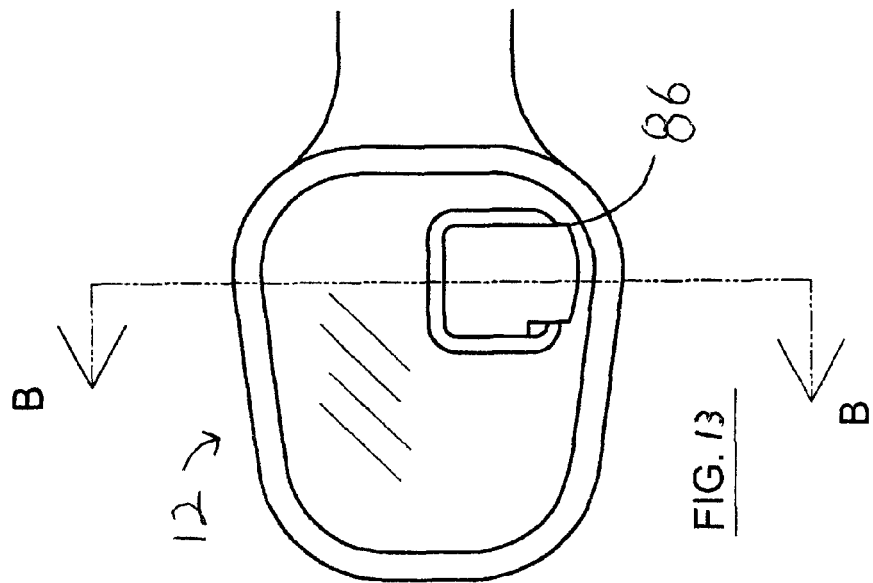
FIG. 13 is a front view looking into a vehicle side view mirror with a double curved mirror of the present invention attached thereto.
Figure 14:
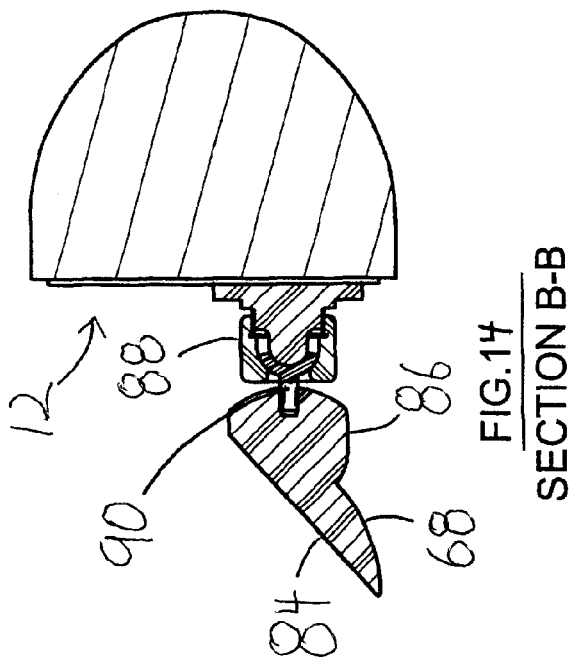
FIG. 14 is a side cross section view along section lines B-B from FIG. 13 showing a vehicle side view mirror with a double curved mirror of the present invention in a pivotable housing, wherein said housing has a base attached to the vehicle side view mirror.
Figure 15:
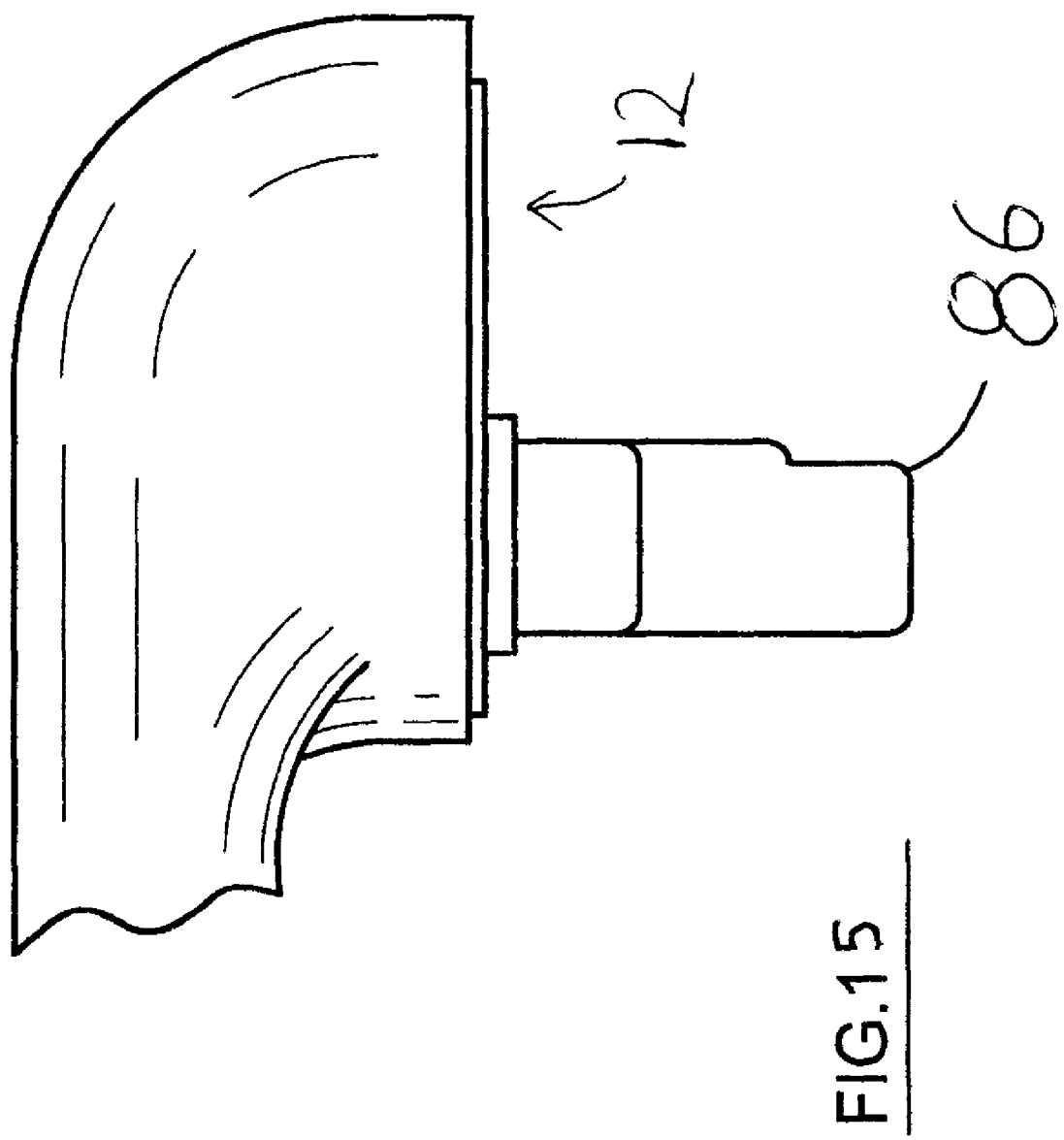
FIG. 15 is a top view of a side view mirror on the passenger side of a vehicle with a double curved mirror of the present invention attached thereto.

FIG. 9 is a side view of double curved mirror 62 mounted on side view mirror 12. Line 82 represents a vertical line with respect to a substantially horizontal orientation of vehicle 10. Double curved mirror 62 is oriented towards the front of vehicle 10 such that the back, non-reflective surface 84 of double curved mirror 62 forms a forward offset angle "x" relative to line 82. In a preferred embodiment, the measure of angle "x" is 30-60°. Because double curved mirror 62 is not vertically oriented, light from oncoming car headlights will not reflect onto side view mirror 12 and will not cause adverse light reflection with driver 50.

Double curved mirror 62 is attached to the car's driver and passenger side view mirrors 12 with the reflective surfaces 74 and 76 facing downwards and towards the front of the car and away from the driver, as discussed above and shown in FIG. 9. This is to enable an image from along driver side viewing area 70 to be reflected into the car's driver or passenger mirrors 12 and then from the car side view mirrors 12 into the driver's field of view 64. Double curved mirror 62 can also be attached to side view mirror 12 in a configuration such that double curved mirror 12 is protruding below the lower edge of the side view mirror 12 such that the lower edge of the side view mirror 12 eliminates the possibility of lights from an oncoming car being reflected onto the curved surface of your device and thusly, into the driver's eyes.

Preferably, double curve mirror 62 is in a housing. The housing can be fixed position housing or can be a movable and adjustable housing. In one embodiment, seen in FIG. 14 housing 86 on a ball joint pivot 90 attached to a base 88 that is attached to side view mirror 12. Housing 86 is adjustable in all directions. The adjustable housing includes a ball joint, a bellows style tubular stem (like the Snake Light) or even a wire molded into a flexible plastic stem which could be bent to achieve mirror adjustment. The object of any mirror adjusting system, including the present invention should be to include adjustment in two axes.

Figure 19:
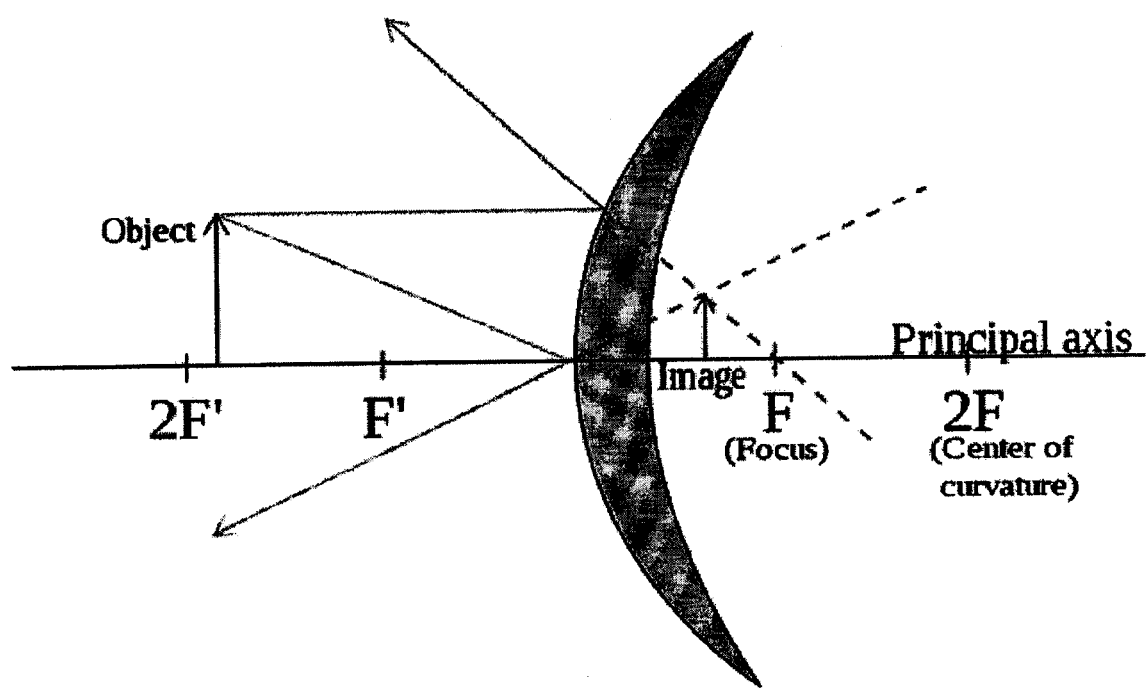
FIG. 19 is a side view of lines of reflection in a convex mirror.

In one embodiment, the double curved mirror 62 of the present invention can be described according to FIG. 19:

A convexly curved mirror, as seen in FIG. 19, is a mirror in which the reflective surface bulges toward the light source. Convex mirrors reflect light away from their center of curvature. Such mirrors always form a virtual image, since the focus F and the centre of curvature 2F are both imaginary points inside the mirror's curvature. A collimated or parallel beam of light diverges after reflection from a convexly curved mirror since the normal to the surface differs at each spot on the mirror's surface. These features make convex mirrors ideal for capturing a wider field of view than a simple planar mirror. Everything appears smaller in such a mirror and the reflected image is always upright.

As to other types of convexly curved mirrors; a convex parabolic mirror will reflect a beam of collimated light to make it appear as if it were radiating from the focal point, or conversely, reflect rays directed toward the focus as a collimated beam. A convex elliptical mirror will reflect light directed towards one focus as if it were radiating from the other focus, both of which are behind the mirror. A convex hyperbolic mirror will reflect rays emanating from the focal point in front of the mirror as if they were emanating from the focal point behind the mirror.

Figure 20:
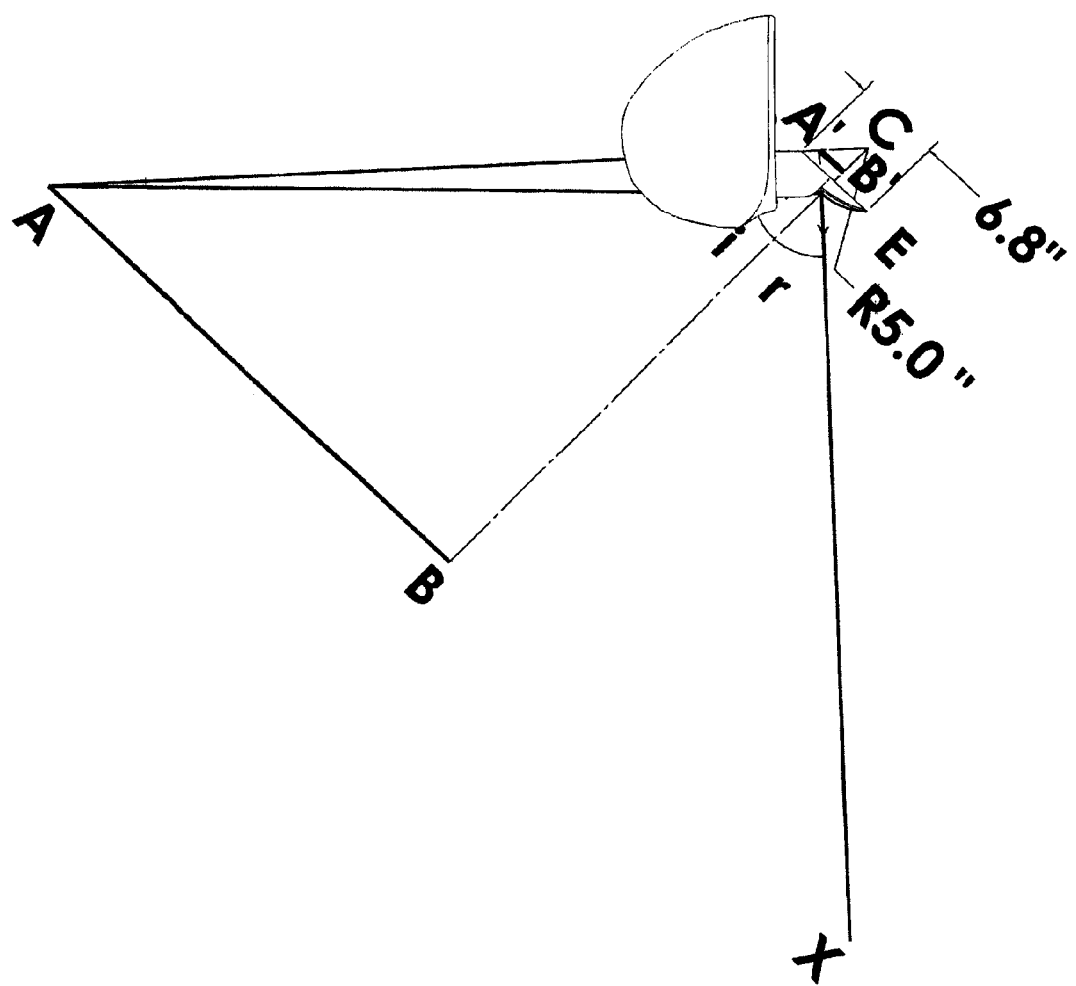
FIG. 20 is a side view showing convex mirror in relation to a vehicle side view mirror.

In one embodiment, the properties of the mirror are calculated as in FIG. 20, distances are for illustrative purposes only and do not limit the invention:

FIELD OF VIEW ENCOMPASSED (distance A-X)=approximately 7 feet. "A" being adjustable near the front of car and front tire. B being below the side view mirror and X being at the below the driver and towards the rear of the driver door.

VIRTUAL IMAGE SIZE WHICH WOULD BE REFLECTED TOWARDS DRIVER MIRROR (2×Distance A'-B' depicted by the red line)=approximately 5"

WIDTH ACROSS ARC OF MIRROR (Distance D-E, D not shown but on the opposite edge of "E")=approximately 6.8"

With any mirror, the angle of incidence "I" equals the angle of reflection "r".

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed is:

1. A vehicle mirror system comprising: a vehicle having a first mirror being an existing exterior vehicle side view mirror having a reflective mirror surface positioned in a housing, said housing encloses said existing exterior vehicle side view mirror; and a second mirror being a double curved reflecting mirror; said second mirror mounted on said housing of said exterior vehicle side view mirror; and said second mirror having a reflective surface opposing and facing said side view mirror, said double curved reflecting mirror being oriented to reflect an image of an area along a lower perimeter of a vehicle onto said side view mirror such that said image is viewable on said side view mirror by a driver operating the vehicle.

2. The system of claim 1 wherein said double curved mirror is in a housing and said housing is attached to a vehicle side view mirror or a vehicle side view mirror housing.

3. The system of claim 1 wherein said double curved side view mirror has a first curvature along a vertical axis and a second curvature along a horizontal axis.

4. The system of claim 1 wherein said double curved side view mirror has a first curvature along a vertical axis and a second curvature along a horizontal axis, said first curvature and said second curvature being of unequal degrees of curvature.

5. The system of claim 1 wherein said double curved mirror is in a housing that is adjustable.

6. A method of viewing an area along a lower perimeter of a vehicle with a side view mirror while operating the vehicle, comprising: providing a second mirror being a double curved reflecting mirror attached to a housing of a first mirror being an existing exterior vehicle side view mirror, said housing encloses said existing exterior vehicle side view mirror, said double curved mirror having a reflective surface opposing and facing said vehicle side view mirror; and reflecting an image of an area from said double curved reflecting mirror onto said vehicle side view mirror such that a vehicle operator in a vehicle operating position can view said image on the surface of said vehicle side view mirror; wherein said image includes a surface on which said vehicle resides.

* * * * *